3,267,153
ARYLOXYSULFONATES AS ORTHO-
ALKYLATION CATALYSTS
Gerd Leston, Pittsburgh, Pa., assignor to Koppers
Company, Inc., a corporation of Delaware
No Drawing. Filed Aug. 13, 1963, Ser. No. 301,902
8 Claims. (Cl. 260—619)

This invention relates to the alkylation of hydroxyaromatic hydrocarbons. In one specific aspect, it relates to the selective alkylation of hydroxyaromatic hydrocarbons, particularly phenols, in a ring position ortho- to the hydroxyl group.

Conventional methods of alkylation, such as Friedel-Crafts alkylation, result in a more or less random introduction of alkyl groups onto the ring of aromatic hydrocarbons, with any preferential alkylation resulting from the steric configuration of the particular aromatic hydrocarbon being alkylated. Friedel-Crafts alkylation involves reacting an aromatic hydrocarbon with a halogenated aliphatic hydrocarbon in the presence of e.g. aluminum chloride. In addition to providing a nonspecific distribution of the various alkylated isomers, the Friedel-Crafts alkylation process suffers the additional disadvantage of the rearrangement of the carbon skeleton when branched chain hydrocarbons are introduced.

A great step forward in the alkylation art was made by George G. Ecke and Alfred J. Kolka, who found that certain metal aryloxides were efficient for the selective ortho-alkylation of phenolic bodies when used as described in U.S. Patent No. 2,821,898. In their patent Ecke et al. describe the selective ortho-alkylation of phenols using the phenoxy derivatives of such elements as aluminum, magnesium, iron, zinc, phosphorus, arsenic, antimony, bismuth and tin.

The pioneer work of Ecke and Kolka created the illusion that a simple choice of a desired metal phenolate was the key to all of the problems of selective ortho-alkylation. Unfortunately, this hope has not been realized. The metal phenolates (or aryloxides) when used as alkylation catalysts, behave in the unpredictable manner typical of most catalyst systems. Of the phenoxy derivatives included in the Ecke et al. patent, only aluminum phenoxide is an excellent catalyst for ortho-alkylation. Magnesium phenoxide is good, and zinc phenoxide is acceptable. The phenoxides of the other metals specifically named by Ecke and Kolka show a mediocre to poor performance as selective ortho-alkylation catalysts.

The use of metal aryloxides as ortho-alkylation catalysts has engendered numerous problems that were unforeseen at the time of their introduction to the art. With respect to the performance of the catalyst, there has been an increasing demand for catalysts capable of providing higher and higher selectivity, as determined by the ratio of ortho- to para-isomers present in the final product. Aluminum phenoxide, which is regarded as an excellent ortho-alkylation catalyst, provides, in many instances a product mixture having an o/p ratio of 15:1 to 40:1. Less effective phenoxides, such as zinc phenoxide, provide an o/p ratio of only 2:1 to 4:1.

Reaction time, of course, is an important commercial consideration. Many of the metal aryloxides named by Ecke et al. are so sluggish in their behavior that the required reaction time becomes prohibitive. Other important considerations include the stability of the catalyst, particularly the moisture, ease of catalyst recovery, and effectiveness of the catalyst on repeated recycle.

The problem of catalyst recycle is particularly exacting when aluminum phenoxide is used as the catalyst. Aluminum phenoxide is soluble in the hydroxyaromatic reactants. The hydroxyaromatics, particularly phenol and the substituted phenols, are notably hygroscopic and it is difficult to avoid contamination of the system with water during a continuous or semicontinuous operation. The catalytic activity of aluminum phenoxide is destroyed by water. Moreover, because of the fact that aluminum phenoxide is soluble in the reaction mixture, the cost of separating the catalyst by fractional distillation is often greater than that involved in simply destroying the catalyst and supplying fresh catalyst to subsequent runs.

I have discovered, unexpectedly, that the aluminum salts of ortho-phenolsulfonic acids, i.e. the aluminum aryloxy sulfonates, are outstanding selective ortho-alkylation catalysts. My new catalysts are insoluble in the reaction mixture, at least at room temperature, and are easily removed by decantation, centrifugation, or filtration, thus avoiding the cumbersome and expensive separation problems involved in the use of aluminum phenoxide and other soluble catalysts.

It is, therefore, an object of the present invention to provide a new and economical selective ortho-alkylation process using a room-temperature-insoluble, easily recoverable catalyst which is as good or better than known catalysts in its selectivity of ortho-alkylation.

In accordance with the invention, a hydroxyaromatic hydrocarbon containing at least one reactive hydrogen in a ring position ortho- to a hydroxyl group is reacted with an olefin at an elevated temperature and a pressure up to 3000 p.s.i.g. in the presence of a catalytic amount of an aluminum aryloxy sulfonate.

The hydroxyaromatic hydrocarbons useful in the invention include all of those conventionally subjected to the alkylation reactions of the heretofore-known art, which have at least one reactive hydrogen in a ring position ortho- to a hydroxyl group. The hydroxyaromatic hydrocarbons can be mono- or polynuclear and also mono- or polyhydroxy; most commonly they are the hydroxybenzenes, hydroxynaphthalenes, bis-phenols and their lower alkyl-, phenyl-, halo- and amino-substituted derivatives. Useful starting materials thus include, phenol, o-cresol, m-cresol, p-cresol, o-, m-, and p-chlorophenol, 2,5-dichlorophenol, thymol, m-ethylphenol, p-t-butylphenol, carvacrol, mono-bromocavacrol, catechol, resorcinol, pyrogallol, alpha-naphthol, mono-chloro-beta-naphthol, o-phenylphenol, p-phenylphenol, alpha-anthrol, o-, m-, and p-aminophenol, guaiacol, anol, eugenol, and isoeugenol.

The olefins useful for alkylation according to the invention also include all of those commonly known to the alkylation art; in particular, mono- or polyolefins, cycloolefins, aryl-substituted olefins, and halo-substituted olefins. Conventional alkylating agents are those having up to 8–12 carbon atoms, although high molecular weight olefins up to those containing about 20 carbon atoms can be used. Useful olefins thus include ethylene, propylene, butylene, isobutylene, amylene, isoamylene, hexene, heptene, butadiene, isoprene, chloroprene, diisobutylene, heptadiene, octene, decene, dodecene, hexadecene, octadecene, eicosene, styrene, alpha-methylstyrene, 2-phenylpropene-1,2-phenylbutene-1, and the like.

The catalyst used in the invention is an aluminum salt of an ortho-phenol sulfonic acid. These catalysts are prepared by reacting aluminum or an aluminum compound, such as an aluminum halide, hydroxide or alkoxide with a sufficient quantity of an ortho-sulfonated phenol, cresol, halo-phenol, lower alkylphenyl, hydroxyphenyl, naphthol, and the like. Particularly useful are the aluminum phenoxy sulfonates of the formula:

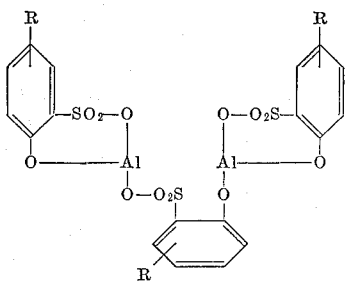

wherein R is hydrogen, lower alkyl, including primary, secondary and tertiary lower alkyl, halo, amino or hydroxy. The most readily available useful catalysts are those having the position para- to the hydroxyl group of the phenol (prior to sulfonation) blocked by an alkyl or halo substituent, because the ortho-phenolsulfonic acids are most easily prepared from a phenol blocked in the para-position. The effectiveness of the novel catalysts is astonishing in view of the poor selectivity afforded by aluminum arylsulfonates, such as aluminum tosylate, as is shown in the examples that follow.

The amount of catalyst used generally ranges between about 0.05 and 20 mole percent, based on the number of moles of the material to be alkylated. Although the preferred amount of catalyst varies to some extent with the degree of alkylation desired, if less than 0.05 mole percent catalyst is used, alkylation is quite slow. For economic reasons no advantage is seen in using more than 20 mole percent catalyst, although no adverse effects are obtained thereby. I prefer to use between about 0.5 and 10 mole percent catalyst for ease of reaction and economical operation.

The alkylation reaction is exothermic. It proceeds smoothly at elevated temperatures as low as 50° C. up to the boiling point of the reaction mixture under the particular pressure applied. Most alkylation reactions can be run at temperatures between 50 and 400° C., preferably between 125 and 300° C.

The reaction is run at pressures ranging from atmospheric pressure up to about 3000 p.s.i.g. For the simple alkylations, for example, the alkylation of phenol or cresol with isobutylene or styrene, the reaction proceeds well at atmospheric pressure and, from the standpoint of equipment costs, the use of atmospheric pressure is most desirable. The more difficult alkylations involving, for example, alkylation with ethylene, high positive pressures in the range of 1200 to 3000 p.s.i.g. are required. It is obviously advantageous for economic reasons to run the reaction at the lowest convenient pressure.

The degree of alkylation depends upon the number of positions capable of alkylation on the hydroxyaromatic hydrocarbon and the mole ratio of the reactants. Monoalkylations can be accomplished using from about 0.3–1.2 moles of olefin per mole of hydroxyaromatic compound. It is often convenient, from the standpoint of avoiding dialkylation, to use considerably less than the stoichiometric quantity of olefin. In this case a high ultimate yield of monoalkylated product is obtained by recycle. The use of 0.3–0.9 moles of olefin, accompanied by recycle, is desirable from the standpoint of obtaining a maximum ultimate yield of monoalkylated product. Dialkylated products are obtained according to the invention by using 1.3–2.5 moles of olefin per mole of hydroxyaromatic hydrocarbon. The lower mole ratios within the indicated range are used when it is desired to avoid the formation of trialkylated products.

The reaction time can be conveniently determined by measuring the amount of olefin absorbed by the reaction mixture. Alternatively, the reaction mixture may be repeatedly sampled and the constitution of the samples can be determined by vapor phase chromatography, as shown in the examples that follow.

Conveniently, alkylation is conducted in the absence of a solvent, although, if desired, any solvent which is inert to the reactants and catalyst under the conditions of the reaction can be employed. Suitable solvents include benzene, toluene, xylene, tetralin, decalin, hexane, heptane, cyclohexane, and the like.

The reaction product of the invention, although primarily a mono-ortho or di-ortho (depending upon the reaction conditions and mole ratio of ingredients) hydroxyaromatic hydrocarbon, also contains unreacted starting material and minor percentages of other isomers.

The desired product can be recovered from the reaction mixture by fractional distillation or by flash distillation followed by fractional distillation.

One of the features of the present invention is the ease of catalyst recovery afforded by using a catalyst that is insoluble in the phenol being subjected to alkylation. After alkylation is complete, the aluminum aryloxide sulfonate can be conveniently removed by centrifugation, filtration or even simple decantation. The process of the invention is especially adaptable to semi-continuous operation, which can be accomplished by filtration of the reaction mixture followed by the recycle of the catalyst. The catalyst can be recycled many times before its activity becomes measurably impaired. Surprisingly, as shown in Example II, recycled catalyst is often even more selective, from the standpoint of ortho-alkylation, than fresh catalyst. Example II shows that o/p weight ratios as high as 100:1 can be obtained using the novel catalyst of the invention.

Continuous operation is facilitated by the stability of the insoluble catalyst to the moisture absorbed by the phenol. Continuous operation can be accomplished by a continuous distillation of the product from the alkylated mixture and continuous separation and recycle of the catalyst, accompanied by a continuous addition of fresh hydroxyaromatic and alkylating agent.

The compounds made by the process of my invention have well established uses in the art, such as monomers for phenolic resins, detergent intermediates, germicides, polymerization inhibitors, antioxidants, and the like.

My invention is further illustrated by the following examples:

EXAMPLE I p-t-Butylphenol, 4.50 g. (30 mmoles) and 3.00 g. (30 mmoles) of concentrated sulfuric acid were heated on a steam bath for two hours to make the sulfonic acid. Next, 0.540 g. (20 moles) of aluminum was added and the mixture refluxed to make the aluminum salt, i.e. aluminum 5-t-butyl-2-phenoxysulfonate. Then 30 ml. (25 g.) of toluene and 75 g. of phenol were added and the mixture was azeotroped to give 22.8 g. toluene and 0.2 ml. of water. Styrene was added during 15 minutes at 160° C. with stirring at reflux. A small sample was removed one-half hour after completion of the addition and the second, one-half hour later. The residue was removed while the insolubles were transferred to a bottle with the acid of benzene. The resulting product was analyzed using gas chromatography with the following results:

TABLE I

| Reaction Conditions | | Gas Chromatographic Analysis in Area Percent [1] | | | | | | | 2,6-BMBP 2,4-BMBP Ratio |
|---|---|---|---|---|---|---|---|---|---|
| Total Time (Hrs.) | Temp., °C. | Styrene | Phenol | OMBP | PMBP | 2,6-BMBP | 2,4-BMBP | o/p Ratio | |
| 0.5 | 160–210 | 0 | 13.3 | 57.6 | 1.2 | 18.6 | 9.2 | 46 | 2.0 |
| 1.0 | 210 | 0 | 14.9 | 55.1 | 1.3 | 19.9 | 8.8 | 42 | 2.3 |

[1] Abbreviations OMBP, PMBP, BMBP are used to designate o-($\alpha$-methylbenzyl)phenol, p-($\alpha$-methylbenzyl)phenol and bis($\alpha$-methylbenzyl)phenol, respectively.

EXAMPLE II

A mixture of 72.0 g. phenol and 25 g. toluene was dried azeotropically, whereby 18.5 g. of the latter and 0.1 g. of water were removed. The settled portion of the catalyst from Example I was washed several times with fresh benzene, most of the solvent was removed and the residue transferred to the above phenol solution by means of a small amount of styrene. The remainder of 72 g. of styrene was added at 145° C. during 15 minutes with stirring at reflux. Samples were taken in hourly intervals starting one hour after completion of the addition and analyzed by gas chromatography with results shown in Table II.

TABLE II

| Reaction Conditions | | Gas Chromatographic Analysis in Area Percent [1] | | | | | | | 2,6-BMBP 2,4-BMBP Ratio |
|---|---|---|---|---|---|---|---|---|---|
| Total Time (Hrs.) | Temp., °C. | Styrene | Phenol | OMBP | PMBP | 2,6-BMBP | 2,4-BMBP | o/p Ratio | |
| 1.0 | 145–151 | 36.9 | 36.9 | 24.4 | 0.3 | 1.7 | -------- | 70 | --------- |
| 2.0 | 151–163 | 19.2 | 25.1 | 46.5 | 0.4 | 8.9 | -------- | 105 | --------- |
| 3.0 | 163–177 | 4.4 | 18.1 | 58.1 | 0.6 | 17.5 | 1.3 | 97 | 13.8 |
| 4.0 | 177–182 | 0.2 | 17.3 | 61.2 | 0.6 | 18.8 | 3.7 | 106 | 5.1 |

[1] Abbreviations OMBP, PMBP, and BMBP are used to designate o-($\alpha$-methylbenzyl)phenol, p-($\alpha$-methylbenzyl)phenol and bis($\alpha$-methylbenzyl) phenol, respectively.

EXAMPLE III 2,4-xylenol, 10.0 g. (0.083 mole) and 3.00 g. (0.030 mole) of concentrated sulfuric acid were heated on a steam bath. Next, 30 ml. of hexane was added and the mixture was refluxed followed by azeotropic distillation, which yielded 0.8 g. of water. Next, 0.540 g. (0.020 mole) of aluminum filings were added and the mixture was refluxed to make the aluminum salt. Phenol, 800 g. (8.50 moles) was added to the mixture and the resultant material was charged to a one-gallon autoclave and heated to 130° C. Isobutylene was added under nitrogen pressure during four hours. The final product was analyzed by gas chromatography and showed 38.9 percent phenol, 47.5 percent o-t-butylphenol, 2.3 percent para-isomer, 7.5 percent 2,6-di-t-butylphenol and 3.7 percent 2,4-isomer.

EXAMPLE IV

The procedure of Example III was repeated except that the catalyst was made by reacting 4.50 g. (0.030 mole) of p-t-butylphenol with 3.09 g. (0.030 mole) of concentrated sulfuric acid, followed by reaction with 0.537 g. of aluminum. This catalyst, along with 833 g. (8.86 moles) of phenol was reacted with isobutylene in the autoclave at 130–135° C. for four hours. Analysis of the final product gave results almost identical to those obtained in Example III.

EXAMPLE V

*t-Butylation of o-cresol*

The procedure of Example III was followed except that no hexane was added. After the addition of 758 g. (7.02 mole) of o-cresol and 30 ml. of toluene, the mixture was azeotroped to remove the water. The mixture was reacted with isobutylene in a one-gallon autoclave at 120° C. for five hours. The product was removed and analyzed by gas chromatography. The analysis showed 57.3 percent o-cresol, 3.0 percent unknown, 37.4 percent 6-t-butyl-2-methylphenol and 1.2 percent each of 4-t-butyl-2-methylphenol and 4,6-di-t-butyl-2-methylphenol.

EXAMPLE VI

*Isopropylation of m-cresol*

The catalyst was prepared as described in Example IV except that 7.5 g. (0.050 mole) of p-t-butylphenol, 5.0 g. (0.050 mole) of sulfuric acid and 0.90 g. of aluminum were used. m-Cresol, 1022 g. (9.47 moles) was added and the resultant mixture was reacted with propylene at 240° C./150–165 p.s.i.g. during three hours. The product was analyzed by gas chromatography and showed 49.3 percent m-cresol, 38.2 percent thymol and 2-isomer, 7.6 percent 4-isomer and unknown, and 4.9 percent di-isopropyl-m-cresol.

I claim:
1. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of a catalytic amount of an aluminum salt of an ortho-phenol-sulfonic acid of the formula:

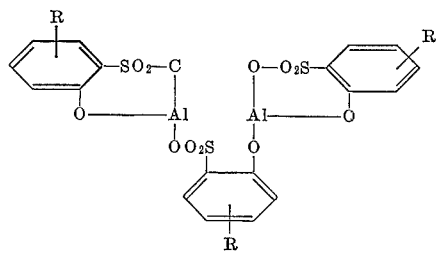

wherein R is a member selected from the group consisting of hydrogen, lower alkyl, halo, amino, and hydroxy.

2. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of 0.05–20 mole percent, based on the number of moles of hydroxyaromatic hydrocarbon being subjected to alkalation, of an aluminum salt of an ortho-phenolsulfonic acid of the formula:

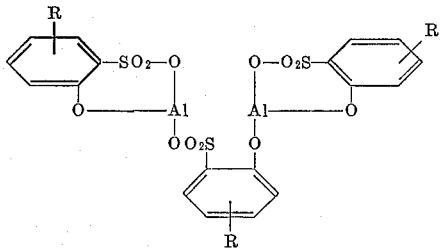

wherein R is a member selected from the group consisting of hydrogen, lower alkyl, halo, amino, and hydroxy.

3. A process according to claim 2 wherein the reaction mixture is cooled, the aluminum salt catalyst is separated by filtration and said catalyst is recycled for reuse.

4. A process for the selective ortho-alkylation of phenol comprising reacting phenol with up to 2.5 moles, per mole of phenol, of an olefin having up to 20 carbon atoms at a temperature of 50–400° C. at a pressure of up to 1200 p.s.i.g. in the presence of 0.5–10 mole percent, based on the number of moles of phenol, of an aluminum salt of an ortho-phenolsulfonic acid of the formula:

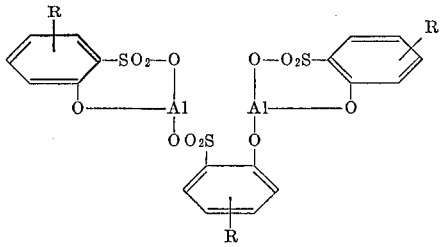

wherein R is a member selected from the group consisting of hydrogen, lower alkyl, halo, amino, and hydroxy.

5. A process for the selective ortho-alkylation of cresol comprising reacting cresol with up to 2.5 moles, per mole of cresol, of an olefin having up to 20 carbon atoms at a temperature of 50–400° C. at a pressure of up to 1200 p.s.i.g. in the presence of 0.5–10 mole percent, based on the number of moles of phenol, of an aluminum salt of an ortho-phenolsulfonic acid of the formula:

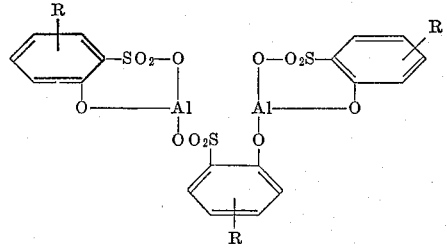

wherein R is a member selected from the group consisting of hydrogen, lower alkyl, halo, amino, and hydroxy.

6. A process for the selective ortho-t-butylation of phenol comprising reacting phenol with up to 2.5 moles, per mole of phenol, of isobutylene at a temperature of 125–300° C. at a pressure of up to 1200 p.s.i.g in the presence of 0.5–10 mole percent, based on the number of moles of phenol, of aluminum 5-t-butylphenoxy sulfonate.

7. A process for the selective ortho-styrenation of phenol comprising reacting phenol with up to 2.5 moles, per mole of phenol, of styrene at a temperature of 125–300° C. at a pressure of up to 1200 p.s.i.g. in the presence of 0.5–10 mole percent, based on the number of moles of phenol, of aluminum 5-t-butylphenoxy sulfonate.

8. A process for the selective ortho-isopropylation of m-cresol comprising reacting m-cresol with up to 2.5 moles, per mole of m-cresol, of propylene at a temperature of 125–300° C. at a pressure of up to 1200 p.s.i.g. in the presence of 0.5–10 mole percent, based on the number of moles of m-cresol, of aluminum 5-t-butylphenoxy sulfonate.

No references cited.

LEON ZITVER, *Primary Examiner.*

D. M. HELFER, *Assistant Examiner.*